United States Patent [19]
Broadbent et al.

[11] Patent Number: 6,107,394
[45] Date of Patent: Aug. 22, 2000

[54] POLYMERIC THICKENERS FOR AQUEOUS COMPOSITIONS

[75] Inventors: Ronald W. Broadbent, Horsham; Kenneth Breindel, Lansdale, both of Pa.

[73] Assignee: Henkel Corporation, Gulph Mills, Pa.

[21] Appl. No.: 09/091,064

[22] PCT Filed: Dec. 4, 1996

[86] PCT No.: PCT/US96/19136

§ 371 Date: Jan. 11, 1999

§ 102(e) Date: Jan. 11, 1999

[87] PCT Pub. No.: WO97/21743

PCT Pub. Date: Jun. 19, 1997

Related U.S. Application Data

[60] Provisional application No. 60/008,388, Dec. 8, 1995.

[51] Int. Cl.$^7$ .............................. C08J 3/00; C08K 3/20; C08L 75/00; C08L 51/00; C08L 77/00
[52] U.S. Cl. .......................... 524/590; 524/538; 524/539; 524/591; 524/839; 524/840; 525/403; 525/424; 525/440; 525/453; 525/454; 525/455
[58] Field of Search ................................... 524/538, 539, 524/591, 839, 848, 590; 525/403, 424, 440, 453, 454, 455

[56] References Cited

U.S. PATENT DOCUMENTS

| | | | |
|---|---|---|---|
| 3,770,684 | 11/1973 | Singer et al. | 260/29.7 NR |
| 4,079,028 | 3/1978 | Emmons et al. | 260/29.6 |
| 4,155,892 | 5/1979 | Emmons et al. | 260/29.2 TN |
| 4,426,485 | 1/1984 | Hoy et al. | 524/591 |
| 4,436,862 | 3/1984 | Tetenbaum et al. | 524/445 |
| 4,499,233 | 2/1985 | Tetenbaum et al. | 524/591 |
| 4,770,804 | 9/1988 | Hentschel et al. | 252/75 |

FOREIGN PATENT DOCUMENTS

| | | |
|---|---|---|
| 48-097783 | 12/1973 | Japan . |
| 1069735 | 5/1967 | United Kingdom . |

OTHER PUBLICATIONS

Encyclopedia of Polymer Science and Engineering, Second Edition, vol. 6, John Wiley and Sons, Inc., 1986, pp. 225–273 and p. 300.

Encyclopedia of Polymer Science and Engineering, vol. 12, John Wiley and Sons, Inc., New York, NY, 1988, pp. 28–43.

McMahon, et al., "Characterization Of Products From Clay Catalyzed Polymerization of Tall Oil Fatty Acids", Journal Of The American Oil Chemist's Society, vol. 51, Dec. 1974, pp. 522–527.

Strauss, et al., "Associative Thickeners—Why you Can't Afford Not to Use Them", 4th Asia–Pacific Conference, Hong Kong, May, 1994, Paper 24.

*Primary Examiner*—Patrick D. Niland
*Attorney, Agent, or Firm*—John E. Drach; Henry E. Millson, Jr.

[57] ABSTRACT

Latexes are thickened by a blend of a urethane compound effective as an associative thickener and a non-urethane compound of the formula: $R^1—(O—A)_a—B^1—R^2—(B^2—R^3)_d—(B^3—(A'—O)_{b-f}—(A'—B^4)_f—R^4—(B^5—R^5)_e)_n—B^6—(A''O)_c—R^6$, wherein $R^1$ and $R^6$ are monovalent hydrophobic groups independently selected from the group consisting of an aliphatic group, a substituted aliphatic group, an aromatic group, and a substituted aromatic group; $R^2$ and $R^4$ are independently selected from the group consisting of aliphatic, substituted aliphatic, aromatic, or substituted aromatic radicals, each radical being divalent or trivalent; $R^3$ and $R^5$ are independently selected from hydrogen, lower alkyl and lower aralkyl; $B^1$, $B^2$, $B^3$, $B^4$, $B^5$ and $B^6$ are linking groups independently selected from the group consisting of an oxygen atom (to form the ether linkage —O—), a carboxylated group (to form an ester linkage $R^2—C(O)—O—$ and/or $R^4—C(O)—O—$, an amino group to form the amine linkage $R^2—N(R)—$ and/or $R^4—N(R)—$, wherein R is hydrogen, lower alkyl, lower aralkyl, or lower acyl), and an amido group (to form the amide linkage $R^2—N(R)—C(O)—$ and or $R^4—N(R)—C(O)—$, wherein R is hydrogen, lower alkyl, lower aralkyl, or lower acyl); each of a, b, c, d, e, f and n are integers, wherein each of a and c are independently any integer from greater than 20 to about 200; b is any integer from greater than 20 to about 450; d, e, and f are zero or 1; and n is any integer from 1 to about 5; and each of A, A' and A" is independently an ethylene, 1,2-propylene, 1,2-butylene unit or combinations thereof.

24 Claims, No Drawings

POLYMERIC THICKENERS FOR AQUEOUS COMPOSITIONS

This application claims benefit of Provisional Application 60/008,388 filed Dec. 8, 1995.

FIELD OF THE INVENTION

This invention relates to polymeric compounds which are useful as thickeners for aqueous compositions, especially emulsion polymer latexes.

BACKGROUND ART

Many aqueous systems require thickeners in order to be useful for various types of applications. Such aqueous-based systems as cosmetics, protective coatings for paper and metal, printing inks, and latex paints all require the incorporation of thickeners in order to have the proper rheological characteristics for their particular uses. Many substances useful as thickeners are known in the art. These include natural polymers such as casein and alginates, and synthetic materials such as cellulose derivatives, acrylic polymers, and polyurethane polymers. Polyurethanes have found particular application as latex paint thickeners.

British Patent No. 1,069,735 teaches a process for making water soluble or water swellable surface active products. One aspect of G.B. 1,069,735 teaches that a polymer of the formula R—Y—A—Y—R wherein R is a hydrocarbon radical having more than 8 carbon atoms, Y is the group —NHCOO—, and A is a polyethylene glycol ether by reaction of a polyethylene glycol ether having a molecular weight of at least 1,000 with a monofunctional isocyanate of the formula RNCO wherein R is a hydrocarbon radical having more than 8 carbon atoms. Another aspect of G.B. 1,069,735 teaches that a polymer of the formula R—Y—(A—T)$_n$—A—Y—R wherein R is a hydrocarbon radical having more than 8 carbon atoms, Y is the group —NHCOO—, A is a polyethylene glycol ether, T is a diisocyanate residue, and n is a whole number ≦10 can be made by reaction of a polyethylene glycol ether having a molecular weight of at least 1,000 with a monofunctional isocyanate of the formula RNCO wherein R is a hydrocarbon radical having more than 8 carbon atoms. A third aspect taught by G.B. 1,069,735 is that a polymer of the formula R—X—(A—T)$_n$—A—X—R wherein R is a hydrocarbon radical having more than 8 carbon atoms; x is the group —NHCOO—, —SCONH—, —NHCONH—, N—CONH—, or —CONH—; A is a polyethylene glycol ether, T is the diisocyanate residue, and n is a whole number ≦10 by reaction of a polyethylene glycol ether having a molecular weight of at least 1,000 and a diisocyanate so that an excess of isocyanate groups is present over those needed to react with the hydroxyl groups of the polyethylene glycol and a monofunctional alcohol, mercaptan, phenol, or carboxylic acid or a primary or secondary amine, said monofunctional compound has a hydrocarbon radical having more than 8 carbon atoms; in which process the total amount of hydrocarbon radical which contains more than 8 carbon atoms does not amount to >6% by weight of the reaction product. Japanese Kokai Patent 48-97783 teaches that compounds of the formula

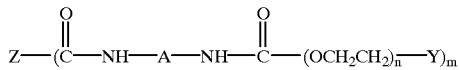

wherein Z is a polyether polyol residue derived from a compound containing active hydrogen atoms and alkylene oxide in which the polyether contains 20%–90% by weight oxyethylene groups; m is a number ranging from 2 to 8 and which signifies the number of hydroxyl groups per polyether polyol molecule; A is the residue of a divalent organic group such as a tolylene diisocyanate residue; Y is a residue of a compound containing active hydrogen atoms such as an ethoxylated $C_{14}$ aliphatic alcohol; and n is a number equal to at least 3, can be used as thickeners in aqueous media such as in latex paints. U.S. Pat. No. 4,079,028 teaches a latex paint composition containing an emulsion polymer and from 0.1 to about 10% by weight based on emulsion polymer solids of a thickener selected from polymers of Groups A, B, and C. Polymers of group A are linear polymers of the formula A—B$_p$—E$_q$—(B—E)$_m$—B$_r$—E$_t$—A wherein each of p, q, r, and t independently is zero or 1; at least one of q and r is 1, and t is zero when r is zero; provided that, when q is 1, then: (a) each of p, r, and t is zero; or (b) p is zero and each of r and t is 1; or (c) t is zero and each of r and p is 1; and when q is zero, then r is 1 and each of p and t is zero; A is a hydrophobic organic radical containing at least one carbon atom; B is a divalent hydrophobic group of the structure

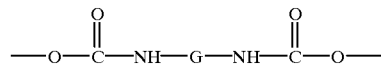

where G is the residue of an organic di- or tri-isocyanate; E is a divalent, hydrophilic, nonionic polyether groups of molecular weight of at least about 1,500 and m is at least 1. Polymers of group B are designated as star-shaped products of the formula [H—E—OCH$_2$]$_s$L[Q$_v$—(D$_u$—E—A)$_w$R$_z$]$_m$ where L is X, Y or —O—, Q is —CH$_2$C≡, D is —CH$_2$O—, m is 2–4, s is zero to 2, the sum of m and s is the valence of L, w is 1–3, and each of u and z independently is zero or 1; and where X is a hydrocarbon radical containing at least 1 carbon atom, preferably 1–4 carbon atoms; and Y is a trivalent radical selected from —OCONH(CH$_2$)$_6$N[CONH (CH$_2$)$_6$NHCO—O]$_2$—, CH$_3$C[CH$_2$—O—OCNHC$_7$H$_6$NHCO]$_3$—, and CH$_3$CH$_2$C[CH$_2$—O—OCNHC$_7$H$_6$NHCO]$_3$— provided that: (a) when L is X, then u and w are each 1, v and z are each zero, the sum of m and s is 4, and m is at least 2; (b) when L is Y, then u, v and s are each zero, m is 3, w is 2–3, and z is zero or 1; (c) when L is —O—, then v and u are each 1, m is 2, w is 1–3, and each of s and z is zero. Polymers of group c are complex mixtures of linear, branched, and sub-branched products which form networks or hydrophobes and hydrophobic segments interspersed with hydrophilic segments. The essential elements of these polymers are a polyfunctional compound containing at least 3 hydroxyl or isocyanate groups, a di-functional compound reactive with the polyfunctional compound, and a monofunctional reactant such as a monohydroxy or monoamino compound. U.S. Pat. No. 4,155,892 teaches a composition consisting essentially of water and an amount of a thickener polymer selected from the polymers disclosed in U.S. Pat. No. 4,079,028 above to thicken the water. U.S. Pat. No. 4,499,233 teaches a water dispersible modified polyurethane which is the product of the reaction of: (a) a polyisocyanate; (b) a polyether polyol;

(c) a modifying agent which is a multifunctional compound such as α,ω-amino alkanes and aromatic diamines such as 1,4-diaminobenzene; and (d) a capping agent such as a monoisocyanate. U.S. Pat. No. 4,499,233 also teaches a thickened aqueous composition comprised of water and from about 0.005 to about 10.00% by weight of a water dispersible modified polyurethane as disclosed above.

U.S. Pat. No. 4,426,485 teaches thickeners for aqueous systems which are water-soluble polymers having a molecular weight of at least 10,000 and which are comprised of hydrophobic segments each containing at least one monovalent hydrophobic group covalently bonded to the polymer. At least one of the hydrophobic segments has at least two hydrophobes thereby forming a bunch of hydrophobes within the hydrophobic segment. The hydrophobes within a bunched hydrophobic segment are in close association when they are separated by no more than about 50 covalently bonded, sequentially connected atoms. One example of such a polymer is made by reacting a polyurethane pre-polymer comprised of PEG 8000 and toluene diisocyanate with toluene diisocyanate and the diol formed by reaction of epichlorohydrin and a 10 mole ethylene oxide adduct of nonyl phenol.

A non-urethane thickener is disclosed in U.S. Pat. No. 3,770,684 which teaches latex compositions containing from about 0.1% to about 3.0% of a compound of the general formula R—X—(water soluble polyether)—X—R' wherein R and R' are water insoluble hydrocarbon residues; X is a connecting linkage selected from the group consisting of an ether linkage, an ester linkage, an amide linkage, an imino linkage, a urethane linkage, an sulfide linkage, or a siloxane linkage. U.S. Pat. No. 3,770,684 also teaches that the preferred water soluble polyether is a polyethylene oxide polymer having a molecular weight of from 3,000 to 35,000 or an ethylene oxide-propylene oxide copolymer having a molecular weight of from 3,000 to 35,000.

SUMMARY OF THE INVENTION

This invention relates to blends of compounds which are useful as thickeners for aqueous compositions, particularly latex paints, said blend comprising a urethane compound effective as an associative thickener and a non-urethane compound having the formula (I):

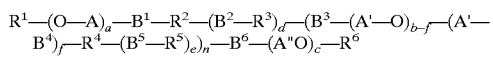

wherein:
- $R^1$ and $R^6$ are monovalent hydrophobic groups independently selected from the group consisting of an aliphatic group, a substituted aliphatic group, an aromatic group, and a substituted aromatic group;
- $R^2$ and $R^4$ are independently selected from the group consisting of aliphatic, substituted aliphatic, aromatic, or substituted aromatic radicals, each radical being divalent or trivalent;
- $R^3$ and $R^5$ are independently selected from hydrogen, lower alkyl and lower aralkyl;
- $B^1$, $B^2$, $B^3$, $B^4$, $B^5$, and $B^6$ are linking groups independently selected from the group consisting of an oxygen atom (to form the ether linkage —O—), a carboxylate group (to form an ester linkage $R^2$—C(O)—O— and/or $R^4$—C(O)—O—), an amino group (to form the amine linkage $R^2$—N(R)— and or $R^4$—N(R)—, wherein R is hydrogen, lower alkyl, lower aralkyl, or lower acyl), and an amido group (to form the amide linkage $R^2$—N(R)—C(O)— and/or $R^4$—N(R)—C(O)—, wherein R is hydrogen, lower alkyl, lower aralkyl, or lower acyl);
- each of a, b, c, d, e, f, and n are integers, wherein each of a and c are independently any integer from greater than 20 to about 200; b is any integer from greater than 20 to about 450; d, e, and f are zero or 1; and n is any integer from 1 to about 5; and
- each of A, A', and A" is independently an ethylene, 1,2-propylene, 1,2-butylene unit or combinations thereof.

In preferred compounds, each of $R^1$ and $R^6$ is independently an aliphatic, substituted aliphatic, aromatic, or substituted aromatic radical having from 4 to about 50 carbon atoms; each of $B^1$–$B^6$ is an oxygen atom; $R^2$ and $R^4$ are both either propanetriyl or meta-xylyl; d and e are either (i) both zero (e.g. when $R^2$ and $R^4$ are both meta-xylyl) or (ii) both 1 and $R^3$ and $R^5$ are hydrogen, methyl or benzyl (e.g. when $R^2$ and $R^4$ are both propanetriyl); f is zero; each of A, A', and A" are ethylene, n is 1, b is from about 50 to about 450, more preferably from about 90 to about 450, and the values of a and c independently range from about 50 to about 150.

This invention relates to a thickened aqueous composition comprised of water, a urethane compound effective as an associative thickener and a thickening-effective amount of one or more compounds of the above formula I and also relates to a latex composition comprising an emulsion polymer and a urethane compound effective as an associative thickener and a thickening-effective amount of one or more compounds of the above formula.

DETAILED DESCRIPTION OF THE INVENTION

In regard to the above formula I, the abbreviations A, A', and A" stand for the ethylene group (—CH$_2$CH$_2$—), the 1,2-propylene group —(CH$_2$CH(CH$_3$)—), or the 1,2-butylene group (—CH(CH$_2$CH$_3$)CH$_2$—) or combinations thereof. Each of the subscripts a, b, c, f, and n are independently any integer as set forth above. One of ordinary skill in the art will appreciate that for mixtures of pure compounds, the subscripts a, b, c, f, and n will have non-integer values to reflect the fact that they represent the average degree of polymerization, e.g. n is from 0.5 to 4.5, preferably 0.5 to 1.5.

$R^2$ and $R^4$ are aliphatic, substituted aliphatic, aromatic, or substituted aromatic radical having a valence of from 2 or 3. Such aliphatic radicals include any di- or trivalent: (a) straight chain and branched alkyl radicals having from 2 to about 50 carbon atoms (preferably divalent or trivalent alkylene radicals having from 2 to 10 carbon atoms); (b) cycloalkyl radicals having from 4 to about 20 carbon atoms; (c) straight chain and branched alkenyl radicals having from 2 to about 40 carbon atoms; (d) cycloalkenyl radicals having from 5 to about 20 carbon atoms; (e) straight chain and branched alkynyl radicals having from 2 to about 30 carbon atoms; cycloalkynyl radicals having from 6 to about 20 carbon atoms; and (f) aralkyl radicals (i.e. alkyl radicals having aromatic groups as pendent substituents or linking alkylene groups) having at least 2 aliphatic carbon atoms along with an aromatic group, e.g. meta-xylyl wherein methylene groups are linked by a benzenoid group). Aliphatic radicals also include those above-mentioned aliphatic radicals which contain one or more heteroatoms substituted for one or more hydrogen atoms. The heteroatoms include the halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like. For purposes of this invention, it is understood that aliphatic includes cycloaliphatic and heterocycloaliphatic wherein the heteroatoms are nitrogen, oxygen, sulfur, and phosphorus.

An aromatic radical is any benzenoid or non-benzenoid aromatic radical having a valence of 2 to 8. A non-benzenoid aromatic radical includes carbocyclic and heterocyclic aromatic radicals. For purposes of this invention, a substituted aromatic radical is any benzenoid or non-benzenoid aromatic radical having a valence of from 2 to 6 wherein one or more hydrogen atoms is replaced by an atom or a group of atoms other than hydrogen including the halogens, nitrogen, sulfur, oxygen, and phosphorus or groups of heteroatoms such as nitro, sulfonic acid, $C_{1-10}$ alkyl sulfonate ester, sulfoxide, sulfone, phosphoryl, trihalomethyl, and the like.

The abbreviations NP, DNP, LA, and TD stand for nonylphenoxy, dinonylphenoxy, lauryl, and tridecyl, respectively. $R^1$ and $R^6$ are monovalent radicals, typically having from about 6 to about 50 carbon atoms. The use of a hydrophobic alcohol to form the ends of the compound of formula I described above results in the formation of hydrophobic ether residues as $R^1$ and $R^6$. A hydrophobic group is any group which contributes to the water insolubility of the ether residue. Unsubstituted aliphatic groups having at least 6 carbon atoms, aromatic groups having 6 or more carbon atoms and groups which contain both aliphatic and aromatic moieties are hydrophobic. Examples of useful hydrophobic ether residues include but are not limited to, tolyl, hexyl, ethylphenyls, heptyl, cumyl, propylphenyls, octyl, butylphenyls, nonyl, phenylphenyls, pentylphenyls, decyl, isohexylphenyls, n-hexylphenyls, n-undecyl, heptylphenyls, lauryl, octylphenyls, isononylphenyls, n-nonylphenyls, tetradecyl, decylphenyls, n-undecylphenyls, hexadecyl, isododecylphenyls, n-dodecylphenyls, stearyl, n-tetradecylphenyls, hexadecylphenyls, and isooctadecylphenyls. Preferred hydrophobes are the nonylphenyl, dinonylphenyl, lauryl, and tridecyl groups.

The use of the term "lower" to modify "alkyl" shall mean an alkyl group having from 1 to about 4 carbon atoms, e.g. methyl, ethyl, n-propyl, isopropyl, and tert-butyl. Further, the term "lower" when used to modify "aralkyl" shall mean an alkyl group having from 1 to about 4 carbon atoms substituted with a benzenoid radical, and the term "lower" when used to modify "acyl" shall mean a carbonyl terminated lower alkyl or lower aralkyl radical.

Each of A, A', and A" groups of formula I represent an ethylene, 1,2-propylene, 1,2-butylene unit or combinations thereof such that each of $(A—O)_a$, $(A'—O)_b$ and $(A"—O)_c$ is a water soluble, or water dispersible polyether group. The water solubility or water dispersibility of a polyether group is a function of its molecular structure and/or its molecular weight. For example, an ethyleneoxy (EO) homopolymer having a molecular weight of about 20,000 daltons or less is water soluble while a water soluble propyleneoxy (PO) homopolymer has a molecular weight of less than about 700 daltons. The structure of an EO—PO copolymer must be such that it contains at least about 50 wt % of ethyleneoxy groups to be water soluble. The structure-property relationships of EO and PO polyethers is described in the *Encyclopedia of Polymer Science and Engineering,* Second Edition, vol. 6, pp. 225–273, (John Wiley and Sons, Inc, 1986), while those of poly PO are described in vol. 6, page 300. In preferred compounds, the A, A', and A" groups consist essentially of ethylene groups, the value of b in formula I above is preferably from about 50 to about 450, more preferably from about 90 to about 450, and the values of a and c preferably range from about 50 to about 150.

The compounds according to the invention are polymeric materials which can be made by any process within the purview of those having ordinary skill in the art. A preferred method is a two-step process, the first step of which comprises forming a mixture of compounds of the following formulas:

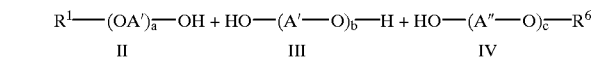

wherein all symbols are as set forth above and under conditions which cause at least a portion of the terminal hydrogen atoms of the hydroxyl groups shown above to ionize leaving alkoxide oxygen atoms. These conditions can be brought about by adding to the mixture a strong base, for example an alkali or alkaline earth metal lower alkyl alkoxide, e.g. sodium methoxide. Of course, when B is an amino or amido group, the terminal hydroxyl of the compounds of formulas I, II, and III should be replaced by an amine nitrogen having the appropriate substituents to introduce the desired B and R groups into the molecule. Examples of such amine functional compounds useful to introduce an amine group are the polyoxyethyleneamine and polyoxypropyleneamines (available under the tradename Jeffamine, from Texaco Chemical Company, Houston, Tex.). Compounds of formula II and IV, but wherein the terminal hydroxy is replaced by an amino nitrogen can be prepared by one of ordinary skill in the art. For example, compounds of formula II and IV can be subjected to a catalyzed ammoniation (with ammonia, or a lower alkylamine or lower acyl amide) for replacement of the hydroxyl, or to a capping of the hydroxyl with epichlorohydrin followed by ammoniation (with ammonia, or a lower alkylamine or lower acylamide) of the resulting glycidol group.

The second step of the two-step process comprises forming a mixture of the product of step one in further admixture with a member selected from the group of a di-etherifying agent, a tri-etherifying agent, a di-esterifying agent, a tri-esterifying agent, and a mixture of two or more of such members. (Of course, when the compounds are amines or amides rather than hydroxyl compounds, the reaction is an alkylation or amidation reaction. To simplify the following description, references below to etherifying agents or esterifying agents in general should be construed as applicable to alkylating agents and amidifying agents, respectively.) This basic reaction can be represented by:

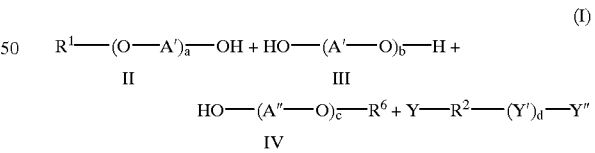

wherein Y, Y' and Y" are leaving groups in the case of etherifying agents or carboxy-functional groups in the case of esterifying agents. (Of course, the hydroxyl groups of the compounds of formulas II, III, and IV are amino or amido groups when B is to be such a linking group. Further, $Y—R^2—(Y')_d—Y"$ can also be an acetal, ketal, or orthoester, in which case Y and Y" are lower alkoxy groups which leave in a transacetalization, transketalization, or transorthoesterification, respectively. This leads to a compound of formula I in which B is an ether linking group from these special classes of ethers, i.e. acetals, ketals or orthoesters.)

It should be noted that when all B linkages are to be, for example, ether linkages, then only a di-etherifying agent and/or a tri-etherifying agent will be used to the exclusion of any esterifying agents. Likewise, when all B linkages are to be ester linkages, then only a di-esterifying agent and/or a tri-esterifying agent will be used to the exclusion of any etherifying agents. Similarly, if both d and e are to be zero (i.e. $R^2$ and $R^4$ are only divalent radicals), then only a di-etherifying agent and/or a di-esterifying agent will be used to the exclusion of any tri-etherifying agents and tri-esterifying agents. Such etherifying (or alkylating) and esterifying (or amidifying) agents are capable of reacting with the hydroxyl (or amine or amide groups) or alkoxide oxygens of the reactants II, III and IV, above. These agents will thus introduce the divalent or trivalent radicals $R^2$ and $R^4$ into the molecule. Examples of etherifying (or alkylating) agents are alkyl halides, e.g. divalent compounds (e.g. alpha,alpha'-dichloro-meta-xylene) that introduce a divalent $R^2$ and/or $R^4$ group into the molecule, e.g. through the same mechanism as a classical Williamson ether (or amine alkylation) synthesis. When $R^2$ and/or $R^4$ are to be aromatic radicals, it may be convenient to employ a di-halo-aromatic compound (e.g. di-bromo-benzene) which can be derivatized to the corresponding mono-Grignard reagent and reacted with the diol reactant of formula III, above (which will cap the diol with ether groups $R^2$ and/or $R^4$ at each end of the diol to form, in the case of di-bromo-benzene, a bis-bromophenyl ether of the diol). This capped adduct can then be sequentially derivatized in a second Grignard reaction, the product of which can be reacted with reactants of formulas II, and IV, above, to give a compound of formula I wherein $R^2$ and/or $R^4$ are aromatic groups.

Further examples of etherifying agents include epihalohydrin compounds, (e.g. those of the formula X—$CH_2$—CH—(O)—$CH_2$ wherein X is a leaving group, for example a halogen, e.g. chlorine which forms a chloride ion as the leaving group) or a precursor of an epihalohydrin (e.g. a compound of the formula X—$CH_2$—CH—(O$R^3$)—$CH_2$—X', wherein X' is a leaving group). When this precursor is used, the epihalohydrin, may be formed, at least in part, in situ, or the alkoxide moieties formed in step one may displace both the X and X' groups in an $S_N^2$ reaction. When $R^3$ and/or $R^5$ are lower alkyl, then the epihalohydrin compound may be an ether having the formula X—$CH_2$—CH—(O$R^3$)—$CH_2$—X', wherein X and X' are leaving groups and $R^3$ is a lower alkyl group (i.e. $C_1$ to $C_4$ alkyl, preferably methyl). Alternatively, the reaction mixture may also contain an alkylating agent of the formula X"—$R^3$ (e.g. methyl chloride or benzyl chloride) that can react with the alkoxide radical (or hydroxyl group) formed by opening of the oxirane ring of the epihalohydrin. This alkylating agent would preferably be added with the epihalohydrin compound to reduce the opportunity of a side reaction with the alkoxide compounds which introduce the $R^1$ and $R^6$ groups into the molecule. Of course, if $R^3$ and $R^5$ are different, then a second epihalohydrin ether having the formula X—$CH_2$—CH—(O$R^5$)—$CH_2$—X' and/or a second alkylating agent having the formula X"—$R^5$ must be employed to introduce the $R^5$ group into the molecule.

Examples of esterifying agents include di-basic and tri-basic organic acids, and reactive derivatives thereof, e.g. acid halides, acid anhydrides, and/or lower esters of such di-basic and tri-basic organic acids (all of which have carboxy-functional groups capable of reacting with the hydroxyl or alkoxide functional compounds of formulas II, III, IV). Because branching is generally undesirable (as discussed below in the context of the epihalohydrin etherifying agents), if an esterifying agent is employed, it is preferably only di-basic, e.g. succinic acid or phthalic anhydride. If a tri-basic acid is employed, a lower alkanol (e.g. methanol) can be added to the reaction mixture so that $R^3$ and/or $R^5$ will be lower alkyl. (This addition of a lower alkanol is similar to the chain stopping effect discussed below in the context of alkyl halides used with epihalohydrins). The reaction conditions for the esterification reaction will of course differ from those appropriate for an etherification reaction. Esterification reactions with polybasic acids are discussed in the *Encyclopedia of Polymer Science and Engineering,* vol. 12, pp. 28–43 (John Wiley and Sons, Inc., New York, N.Y., 1988), the disclosure of which is incorporated herein by reference. The presence of ester linkages is less desirable when the compound will be used in aqueous compositions that are not at an essentially neutral pH (e.g. from a pH of about 6.5 to about 7.5). Because many latex compositions are formulated to have an alkaline pH (e.g. about pH 9 to about pH 11), compounds of formula I wherein all B linkages are ether linkages are preferred for their resistance to hydrolysis.

The ratios of the reactants of formulas II, III, and, IV may vary, but will generally range within 20 mole % to 45 mole % each of the compounds of formula II and IV (if $R^1$ and $R^6$ are the same, then the amount of the single reactant will, thus, be 40 mole % to 90 mole %) and 3 mole % to 60 mole %, preferably 10 mole % to 60 mole %, of the compound of formula II. The amount of the etherifying or esterifying compound that is then reacted with the alkoxides may also vary, but will generally range from about 0.25:1 to about 1.5:1.0 (preferably about 0.8:1 to 1.2:1) equivalents of etherifying agent or esterifying agent (a divalent agent having two equivalents per mole) to hydroxyl equivalent weights of the reactants of formulas II (having one equivalent per mole), III (having two equivalents per mole), and IV (having one equivalent per mole).

It is believed that compositions which contain predominantly compounds of formula I are superior thickeners compared to compositions which contain compounds wherein $R^3$ and/or $R^5$ are not hydrogen, lower alkyl, or lower aralkyl, but are larger organic groups. Such larger organic groups can result from the reaction of a second molecule of epichlorohydrin with, e.g., the intermediate alkoxide compound of the formula:

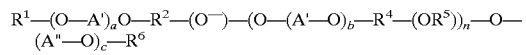

and that this second molecule of epichlorohydrin can react, or may already have reacted, with the alkoxide $R^1$—(O—A')$_a$—O⁻ (or $R^6$—(O—A")$_c$—O⁻). In this case, a compound will be formed which has a similar structure to the compounds of formula I, but in which $R^3$ will then have the formula:

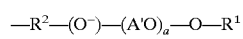

which yields a molecule with significant branching in its molecular structure. Of course, such branching can also occur at $R^4$ wherein $R^5$ is similarly replaced by the reaction product of a second molecule of epichlorohydrin and an alkoxide. (If a tri-esterifying agent is used, then the branching will result from reaction of the third carboxyl group with one of the reactants of formulas II, III, and IV.) This branching is believed to be detrimental to the performance of the molecule as a thickener for latex compositions. Thus, techniques to reduce this branching and produce compositions comprised predominantly of compounds of formula I should be employed in preparing the compounds of this invention.

Techniques to reduce branching include maintaining a comparatively low concentration of free epichlorohydrin in the reaction mixture. This can be done by using less than the stoichiometric amount of epichlorohydrin or by slow addition of the stoichiometric amount of epichlorohydrin. In the former case, there will be excess alkoxide present that should be recovered and recycled to maintain an efficient production process. In the latter case, slow addition of the epichlorohydrin will reduce the rate of product throughput in the reactor vessel.

Another useful technique is to introduce a reactant which will compete with the epichlorohydrin in the branching reaction. For example, water or an alkylating agent can react with the alkoxide group of the intermediate alkoxide compound set forth above. If water reacts with the alkoxide intermediate, branching is inhibited because the alcohol group is not as reactive with free epichlorohydrin as the alkoxide group of the alkoxide intermediate. Typical concentrations of water in the reaction medium range from 100 ppm to 2000 ppm water in the reaction solvent. If a lower alkyl alkylating agent reacts with the alkoxide intermediate, the alkoxide is capped with a lower alkyl group, thus preventing reaction (i.e. a sort of chain stopping effect) with free epichlorohydrin or the reaction product of epichlorohydrin with the hydrophobe alkoxide $R^1$—(O—A')$_a$—O$^-$ and/or $R^6$—(O—A")$_c$—O$^-$.

Urethane Thickeners

The urethane thickeners useful of the invention are urethane-functional compounds having at least two hydrophobic segments separated by at least one hydrophilic segment. These segments allow the polymer to act as an associative thickener for an oil-in-water emulsion. Examples of such compounds are found in U.S. Pat. No. 4,079,028, (Emmons et al.), the disclosure of which is incorporated herein by reference. Typically, the polymers have at least three low molecular weight hydrophobic groups at least two of which are terminal (external) hydrophobic groups. Many of the polymers also contain one or more internal hydrophobic groups. The hydrophobic groups typically together contain a total of at least 20 carbon atoms and are typically linked through hydrophilic (water soluble) groups containing polyether segments of at least about 1,500, preferably at least about 3,000, molecular weight each so that the polymers readily solubilize in water, either by self-solubilization or through interaction with a known solubilizing agent such as a water miscible alcohol or surfactant. The molecular weight of the polyurethanes is typically of the order of about 10,000 to 200,000.

The polymers are prepared in non-aqueous media and are the reaction products of at least reactants (a) and (c) of the following reactants: (a) at least one water soluble polyether polyol, (b) at least one water insoluble organic polyisocyanate, and (c) at least one monofunctional hydrophobic organic compound selected from monofunctional active hydrogen compounds and organic monoisocyanates.

The polyether polyol reactant (a) is an adduct of an alkylene oxide and a polyhydric alcohol or polyhydric alcohol ether, a hydroxyl-terminated prepolymer of such adduct and an organic polyisocyanate, or a mixture of such adducts with such prepolymers.

The organic polyisocyanates of reactant (b) include simple di- and triisocyanates, isocyanate-terminated adducts of such polyhydric alcohols and organic di- or triisocyanates, as well as isocyanate-terminated prepolymers of polyalkylene ether glycols and organic di- or triisocyanates.

By "monofunctional active hydrogen compound" is meant an organic compound having only one group which is reactive with isocyanate, such group therefore containing an active hydrogen atom, any other functional groups, if present, being substantially unreactive to isocyanate. Such compounds include monohydroxy compounds such as alcohols, alcohol ethers and monoamines, as well as polyfunctional compounds providing the compound is only monofunctional to isocyanates. For example, the primary amines, although di-functional in many reactions, are only monofunctional towards isocyanates, the hydrogen atom in the resulting urea group being relatively unreactive to isocyanate as compared with the hydrogen atom of the amino group or of unhindered alcohols. Reactant (c) is a "capping" compound or chain-terminating compound, meaning it reacts with ("caps") the terminal functional groups of the reactants (a) or (b), thus terminating the polymer growth from that terminal functional group.

The hydrophobic groups of the polyurethanes occur in the residues of reactants (b) and (c). The terminal (external) hydrophobes are the residues of the monofunctional active hydrogen compounds, organic monoisocyanates, or combinations of the residues of such compounds.

By appropriate selection of reactants and reaction conditions, including proportions and molecular weights of reactants, a variety of polymeric products may be obtained. The products exhibit good thickening properties due to the presence and distribution therein of hydrophilic (polyether) groups (residues of the polyol reactant) and hydrophobic groups (residues of hydroxy compounds, amines and/or isocyanates).

The reactants are normally employed in substantially stoichiometric proportions, that is, the ratio of total equivalents of active hydrogen containing reactants (whether mono or polyfunctional) to isocyanate reactants is at least 1:1. A slight stoichiometric excess (e.g., about 5–10%) of monofunctional active hydrogen containing compound may be used to eliminate any unreacted isocyanate functionality, thus avoiding toxicity from this source. Greater excesses, particularly of capping hydroxyl compound, may be used to increase thickening efficiency. A slight excess of a monoisocyanate is sometimes desirable in cases where such isocyanate is a capping hydrophobe, to ensure capping of all available active hydrogen functionality.

The polyol and polyisocyanate reactants preferably consist essentially of diols and di-isocyanates so that the product will be essentially linear. The use of diols, di-isocyanates, and a monofunctional active hydrogen compound as a capping compound will thus lead to products having the general structural formula:

wherein:

H is a hydrophobic organic radical which is the residue of reactant (c),

J is a divalent hydrophobic group of the structure:

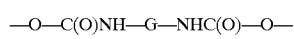

wherein G is the residue of an organic di- or triisocyanate, the residue having no remaining unreacted isocyanate groups;

E is a divalent, hydrophilic, nonionic polyether group; and n is at least 1, such as about 1–20, preferably 1–10.

The use of diols, di-isocyanates, and a monofunctional isocyanate as a capping compound will thus lead to products having the general structural formula:

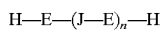

wherein:

H is a hydrophobic organic radical which is the residue of reactant (c),

J is a divalent hydrophobic group of the structure:

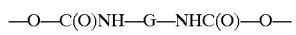

wherein G is the residue of an organic di- or tri-isocyanate, the residue having no remaining unreacted isocyanate groups;

E is a divalent, hydrophilic, nonionic polyether group; and n is at least 1, such as about 1–20, preferably 1–10.

It will be apparent to the polymer chemist that values of n given in this specification are average rather than absolute values since in reaction products of the type of this invention, the reaction product will often be a mixture of several products having different values for n.

It should be understood that in preparing the urethane polymer, capping of all hydroxyl is not required. Capping or hydrolyzing of all isocyanate, although not absolutely necessary, is preferred to avoid toxicity in the polymeric product. Generally, no more than about 25% of the hydroxyl should remain uncapped since the hydroxyl increases the water solubility and reduces thickening efficiency. Of course, if the product contains a relatively high proportion of hydrophobic residues a greater amount of uncapped hydroxyl can be tolerated.

As a general rule, the urethane polymers will provide good thickening if the polyether segments have molecular weights of at least 1500 (preferably 3000–20,000), the polymers contain, on the average, at least three hydrophobic groups and at least two water soluble polyether segments linking the hydrophobes, the sum of the carbon atoms in the hydrophobic groups being at least 20, preferably at least 30, and the total molecular weight is about 10,000–200,000, preferably 12,000–150,000. The optimum polyether content will depend, of course, on the bulk and distribution of the hydrophobic groups in the polymer. Whereas a total polyether molecular weight of 4000–5000 may be suitable when the polymer contains small external and internal hydrophobes, the polyether content may have to be substantially increased when heavier and/or more extensively branched hydrophobic groups are to be built into the polymer, such as long chain fatty polyols or amines. About 200 carbon atoms in the hydrophobic portion is the practical upper limit although it will be understood that it is a relative matter since the proportion of polyether may be increased to offset increased hydrophobicity. However, as total molecular weight increases the viscosity increases and ease of handling decreases, and therefore the economic usefulness of the products is substantially diminished.

The relatively low molecular weights of the polymers in conjunction with their nonionic character promote their efficiency as thickeners, since their thickening capabilities are much greater for equivalent molecular weight in a given aqueous system, as compared with known thickeners, and the polymers are believed to thicken by an associative mechanism such as micellar or other form of association, rather than by molecular weight or chain extension alone. For example, 1.0% by weight of the polymers in an aqueous dispersion will provide thickening equivalent to that afforded by other nonionic thickeners at much higher concentrations. Of course, the ability to obtain good thickening at relatively low molecular weight and solids levels also promotes other properties, such as softening effects on fabrics when the polymers are used in fabric finishing compositions. In addition, the use of organic isocyanate residues as internal or external hydrophobes also makes the polymers relatively stable to hydrolytic degradation, thereby greatly expanding their usefulness, as in systems requiring extended shelf life.

In certain applications, such as latex paints, polymers of the invention can provide excellent flow and leveling as well as thickening. In other applications, such as paper coating compositions where high shear thickening is important, polymers of the invention can easily be selected which are superior in this respect, while also retaining good thickening capabilities and low shear viscosity.

The first class of reactants (a) used to form the polyurethanes of the invention are water soluble polyether polyols. Typically, these are adducts of an aliphatic, cycloaliphatic or aromatic polyhydroxy compound such as a polyhydric alcohol or polyhydric alcohol ether and an alkylene oxide such as ethylene oxide or propylene oxide, or they may be hydroxyl-terminated prepolymers of such adducts and an organic polyisocyanate. The adducts or prepolymers may be mixtures of two or more of such adducts or prepolymers, and mixtures of such adducts with prepolymers may also be used. The polyhydric alcohols include not only the simple glycols such as ethylene glycol and propylene glycol but also hydroxy compounds containing three or more hydroxyl groups, such as polyalkylolalkanes (e.g., trimethylol propane, pentaerythritol) and polyhydroxyalkanes (e.g., glycerol, erythritol, sorbitol, mannitol, and the like). The polyhydric alcohol ethers usually are adducts of polyhydric alcohols and alkylene oxides but in some cases are present as byproducts with other polyhydroxy compounds. For example, pentaerythritol as ordinarily prepared contains about 15% of the ether, dipentaerythritol. Typical of cycloaliphatic polyhydric compounds are 1,2-cyclopentanediol, 1,4-cyclohexanediol, hexahydroxycyclohexane, and the like. The polyhydroxy compounds also include aromatic compounds such as di- and trihydroxy benzene and the like.

A convenient source of the hydrophilic polyether polyol adducts is a polyalkylene glycol (also known as polyoxyalkylene diol) such as polyethylene glycol, polypropylene glycol or polybutylene glycol, of about 4,000–20,000 molecular weight. However, adducts of an alkylene oxide and a monofunctional reactant such as a fatty alcohol, a phenol or an amine, or adducts of an alkylene oxide and a di-functional reactant such as an alkanolamine (e.g., ethanolamine) are also useful. Such adducts are also known as diol ethers and alkanolamine ethers. Suitable compounds providing polyether segments also include amino-terminated polyoxyethylenes of the formula $NH_2(CH_2CH_2O)_xH$ where x ranges from about 10 to 200. Such compounds are sold under the trademark "Jeffamine", a typical compound being "Jeffamine 2000" of about 2000 molecular weight.

The second class of reactants (b), the water insoluble organic polyisocyanates, or isocyanates used to form the hydroxyl-terminated prepolymers included among reactants (a), may be aliphatic, cycloaliphatic or aromatic, such as the following, and may be used singly or in admixture of two or more thereof including mixtures of isomers: 1,4-tetramethylene diisocyanate, 1,6-hexamethylene diisocyanate ("HDI"), 2,2,4-trimethyl-1,6-diisocyanatohexane, 1,10-decamethylene diisocyanate, 1,4-cyclohexylene diisocyanate, 4,4'-methylene bis(isocyanatocyclohexane), 1-isocyanato-3-isocyanatomethyl-3,5,5-trimethylcyclohexane, m- and p-phenylene diisocyanate, 2,6- and 2,4-tolylene diisocyanate ("TDI"), xylene diisocyanate, 4-chloro-1,3-phenylene diisocyanate, 4,4'-biphenylene diisocyanate, 4,4'-methylene diphenylisocyante ("MDI"), 1,5-naphthylene diisocyanate, 1,5-tetrahydronaphthylene diisocyanate, polymethylene polyphenylisocyanates sold under the brand name "PAPI," such as "PAPI 135" (equivalent weight of 133.5 and average isocyanate functionality of 2.7) and "PAPI 901" (equivalent weight of 133 and average isocyanate functionality of 2.3), aromatic tri-isocyanate adduct of trimethylol propane and tolylene diisocyanate sold under the brand name "Mondur CB-75", aliphatic tri-isocyanate product of the hydrolytic trimerization of 1,6-hexamethylene diisocyanate, sold under the brand name "Desmodur N", C36 dimer acid diisocyanate sold under the brand name "DDI", based on dimer acids as discussed in J. Am. Oil Chem. Soc. 51, 522 (1974).

The monoisocyanates representative of one form of reactant (c) include straight chain, branched chain and cyclic isocyanates such as butyl isocyanate, octyl isocyanate, dodecyl isocyanate, octadecyl isocyanate, cyclohexyl isocyanate and the like. These isocyanates also may be used singly or in mixtures of two or more thereof and are a convenient method of introducing terminal hydrophobes into the polymer.

The mono or polyisocyanates also include any polyfunctional isocyanate derived from reaction of any of the foregoing isocyanates and an active hydrogen compound having a functionality of at least two, such that at least one isocyanate group remains unreacted. Such isocyanates are equivalent to chain-extending an isocyanate terminated isocyanate/diol reaction product with a reactant containing at least two active hydrogen atoms in a manner well known in polyurethane synthesis.

The isocyanates may contain any number of carbon atoms effective to provide the required degree of hydrophobic character. Generally, about 4 to 30 carbon atoms are sufficient, the selection depending on the proportion of the other hydrophobic groups and hydrophilic polyether in the product.

Representative of monofunctional active hydrogen compounds of the third class of reactants (c) wherein the functional group is hydroxyl are the fatty (C1–C24) alcohols such as methanol, ethanol, octanol, dodecanol, tetradecanol, hexadecanol, and cyclohexanol; phenolics such as phenol, cresol, octylphenol, nonyl and dodecyl phenol; alcohol ethers such as the monomethyl, monoethyl and monobutyl ethers of ethylene glycol, and the analogous ethers of diethylene glycol; alkyl and alkaryl polyether alcohols such as straight or branched (C1–C22) alkanol/ethylene oxide and alkyl phenol/ethylene oxide adducts (e.g., lauryl alcohol, t-octylphenol or nonylphenol ethylene oxide adducts containing 1–250 ethylene oxide groups); and other alkyl, aryl and alkaryl hydroxyl compounds including mixtures thereof, such as C10–C20 normal alcohol mixtures known as "Alfol" alcohols.

Examples of ethoxylated alcohols useful as reactant (c) include nonionic surfactants, for example, adducts of 4 to 40 moles and preferably 4 to 20 moles of ethylene oxide with 1 mole of fatty alcohol or alkylphenol. Particularly important nonionic surfactants are the adducts of 5 to 16 moles of ethylene oxide with coconut oil or tallow fatty alcohol, with oleyl alcohol or with secondary alcohols containing 8 to 18 and preferably 12 to 18 carbon atoms and with mono- or dialkylphenols containing 6 to 14 carbon atoms in the alkyl groups. In addition to these water-soluble nonionic surfactants, however, water-insoluble or substantially water-insoluble polyglycol ethers containing 1 to 4 ethylene glycol ether groups in the molecule are also of interest.

Amino compounds, which may be used in place of all or a portion of the monohydroxy compounds as monofunctional active hydrogen compounds, are primary or secondary aliphatic, cycloaliphatic or aromatic amines such as the straight or branched chain alkyl amines, or mixtures thereof, containing about 1–20 carbon atoms in the alkyl group. Suitable amines include n- and t-octyl amine, n-dodecyl amines, C12–C14 or C18–C20 t-alkyl amine mixtures, and secondary amines such as N,N-dibenzyl amine. N,N-dicyclohexyl amine and N,N diphenyl amine. The lower alkyl (C1–C7) amines may be used if there is sufficient hydrophobic residue in the product from other sources such as isocyanate or hydroxyl compound to provide a total of at least ten carbon atoms in the terminal group (taken together) of the polymeric products. The amino compounds may contain more than one active hydrogen atom provided that under normal reaction conditions it is only monofunctional towards an isocyanate group. A primary amine is an example of such a compound.

The polymers are prepared according to techniques generally known for the synthesis of urethanes preferably such that no isocyanate remains unreacted. Water should be excluded from the reaction since it will consume isocyanate functionality. Anhydrous conditions are accomplished by azeotropic distillation to remove water, by heating under a nitrogen sparge, or by prior drying of reactants.

If desired, the reaction may be run in a solvent medium in order to reduce viscosity in the reaction leading to higher molecular weight products. High viscosity in the reaction medium causes poor heat transfer and difficult mixing. Generally, a solvent is useful when molecular weights of 30,000 or higher are encountered. Below this molecular weight, a solvent is not typically required. When used, the solvent should be inert to isocyanate and capable of dissolving the polyoxyalkylene reactant and the urethane product at reaction temperature. Suitable inert solvents include non-active hydrogen containing compounds such as benzene, toluene, xylene and other well-known solvents rich in aromatic hydrocarbons such as the solvents sold under the trademarks "Solvesso 100" or "Solvesso 150", as well as esters such as ethyl acetate, butyl acetate and "Cellosolve" acetate, and dialkyl ethers of ethylene glycol, diethylene glycol, and the like. Many other well-known solvents can also be used.

Reaction temperature is not critical. A convenient reaction temperature is about 40° C. to 120° C., preferably about 60° C. to 110° C. Reaction temperature should be selected to obtain reasonably fast reaction rate while avoiding undesirable side reactions, such as isocyanate-urethane condensation.

The order of reactant charging is not critical in most cases, but it may affect the geometry and/or degree of polymerization of the resulting polymer. However, in some instances, as where the reactants are higher molecular weight or polyfunctional, order of addition obviously should be controlled to avoid gelation. For example, to avoid high molecular weight while obtaining a good proportion of hydrophobic character, it may be desirable to first charge the hydrophobe-contributing reactant, such as mono-hydroxy compound, amine or monoisocyanate, followed by the polyisocyanate and polyoxyalkylene glycol. If higher molecular weight is desired, the hydrophobe-contributing reactant may be charged after the polyisocyanate and polyoxyalkylene glycol, or a portion of the hydrophobic reactant may be charged initially and the balance added after the remaining reactants. Charging also may be continuous or semi-continuous, if desired.

Linear polymers of a relatively greater degree of polymerization are conveniently prepared by forming a prepolymer of a polyoxyalkylene glycol and a diisocyanate, and then capping the prepolymer with a monoisocyanate or mono-diisocyanate mix, when the prepolymer has hydroxyl terminal groups, or with a monohydric or amino compound (or alkylene oxide adduct of a monohydric compound or of an amino compound) when the prepolymer has isocyanate terminal groups. Linear polymers of relatively lesser degree of polymerization can be obtained by first reacting a di-isocyanate with a monofunctional active hydrogen compound followed by reaction of this adduct with a polyoxyalkylene glycol or by reacting a polyoxyalkylene glycol with an excess of di-isocyanate followed by capping of the resulting adduct with a monofunctional active hydrogen compound. Similarly, a polyoxyalkylene glycol can be first reacted with a mono-isocyanate compound and the resulting adduct reacted with a di-isocyanate or a di-isocyanate can be reacted with an excess of a polyoxyalkylene glycol followed by capping of the resulting adduct with a mono-isocyanate.

Reactant ratios can plan an important role in determining the properties of the polymers. For example, when the linear polymers are prepared from isocyanate-terminated polyethylene glycol (PEG-molecular weight 6,000–7,500) prepolymers capped with decyl or dodecyl alcohol and where the isocyanate in tolylene diisocyanate (TDI), an alcohol/PEG/TDI equivalent ratio of 0.2–0.3/0.8–0.7/1.0 gives polymers which are excellent thickeners for latex paints. When, however, the ratio is about 0.1/0.9/1.0 the thickening ability is somewhat less but flow and leveling capabilities in the paints are very good.

Order of addition, reactant proportions and other conditions of reaction thus may be varied to control the geometry, molecular weight and other characteristics of the products, in accordance with well-known principles of polyurethane synthesis.

Prepolymers, adducts or other reactants containing ester groups should be avoided, due to hydrolytic instability of products containing such groups. However, the reactants may contain any other groups provided such groups are inert, i.e., they do not interfere in formation of the desired products. For example, halogens such as chlorine and bromine normally would not prevent formation of useful polymers.

Aqueous compositions comprised of thickeners according to the invention are also part of the invention. These compositions are comprised of water, a urethane compound, and one or more compounds of formula I. A thickening-effective amount is any amount required to bring the viscosity of the aqueous composition within the range desired for the intended application, e.g. a Brookfield viscosity of from about 3,000 to about 5,000 cps (spindle #3, @ 30 r.p.m.). This amount will typically be from about 1 to about 50% by weight of compounds according to the invention. An aqueous composition according to the invention may also be comprised of from about 1 to about 50% by weight of one or more compounds according to the invention, and, optionally, from about 1% to about 30% by weight of a viscosity modifier which is a compound selected from the group consisting of a liquid polyol, a liquid ethoxylated or propoxylated $C_{1-8}$ alcohol, or a liquid ethoxylated or propoxylated $C_{1-8}$, carboxylic acid. A liquid polyol is any compound having two or more —OH groups which is a liquid at room temperature, examples of which include but are not limited to ethylene glycol, 1,2-propylene glycol, 1,3-propylene glycol, 1,2-butylene glycol. A liquid ethoxylated or propoxylated $C_{1-8}$ alcohol is any aliphatic alcohol ethoxylated or propoxylated to any degree of ethoxylation or propoxylation and which is a liquid. Compounds in which the —OH group of the liquid ethoxylated or propoxylated $C_{1-8}$ alcohol is etherified with a $C_{1-4}$ alkyl group are also included in this group. A liquid ethoxylated or propoxylated $C_{1-8}$ carboxylic acid is any aliphatic carboxylic acid ethoxylated or propoxylated to any degree of ethoxylation or propoxylation and which is a liquid. Preferred viscosity modifiers include butoxy triglycol (triethylene glycol monobutyl ether), butyl carbitol (diethylene glycol monobutyl ether), or 1,2-propylene glycol. Also preferred are combinations of butoxy triglycol, butyl carbitol, and 1,2-propylene glycol which total from about 1% to about 30% by weight of the total composition. An aqueous composition will typically contain about 40% by weight of water, about 40% by weight of a thickener according to the invention and about 20% by weight of one or a combination of butoxy triglycol, butyl carbitol and 1,2-propylene glycol. The preferred composition is comprised of about 40% by weight of water, about 40% by weight of a thickener according to the invention and about 20% by weight of butoxy triglycol.

The thickeners according to the invention also afford commercial thickener products which have important economic and practical advantages over conventional thickener products because they contain significantly greater amounts of thickener per unit weight of product. For example, typical commercial thickeners are aqueous compositions containing from about 20% to about 30% by weight thickener and having a Brookfield viscosity of about 15,000 cps. Thickener products containing thickeners according to the invention can be sold commercially as aqueous-based compositions containing from about 35% to about 40% by weight thickener and having Brookfield viscosities ranging from about 400–20,000 cps. The thickeners according to the invention afford commercial products which are higher in solids and are easier to handle because of their lower viscosities.

The thickeners according to the invention are very efficient in increasing the high shear and low shear viscosities of latexes or latex paint compositions into which they have been incorporated. Latexes are emulsions or dispersions of water insoluble polymers in water. Latex paint compositions typically contain at least an aqueous emulsion or dispersion of a water insoluble polymer, a pigment, a pigment dispersant, a thickener to control the viscosity and improve the leveling and flow characteristics of the paint, and a preservative which is effective in controlling the growth of microorganisms. Present paint industry standards call for a latex paint having an ICI viscosity of from about 0.8 to about 3.0 poise and a Stormer viscosity of from about 90 to about 110 KU. The ICI viscosity is a high shear viscosity and is measured on the ICI (Research Equipment Limited) Cone and Plate Viscosimeter at a shear rate of about 10,000 sec$^{-1}$. The Stormer viscosity is given in Krebs Units (KU) and is measured according to ASTM D662-81. Examples of the latexes which can be thickened with the thickeners according to the invention are those disclosed in U.S. Pat. No. 4,079,028 at column 12, line 64, to column 14, line 7, the entire contents of which are incorporated herein by reference.

The thickening ability of the compounds according to the invention can vary with the type of substance to be thickened. For example, some compounds may be very efficient at thickening acrylic latexes and not as efficient at thickening styrene-acrylic latexes while others may exhibit the opposite behavior. In addition, the thickening ability of a particular compound may also change when that compound is used in a paint formulation as opposed to a composition comprising only latex and water.

For most commercial applications, a latex is thickened by adding a sufficient amount of an aqueous composition according to the invention to a latex to bring the ICI viscosity into the 0.8 to 3.0 poise range and the Stormer viscosity into the 95 to 105 KU. Typically this amount will be in the range of from about 0.1% to about 10% of the thickener according to the invention by weight of latex polymer solids and preferably between 1% and 3% by weight of latex polymer solids. The following examples are meant to illustrate, but not limit, the invention. U.S. Ser. No. 07/787,905, filed Nov. 7, 1991, discloses related materials and methods, the entire disclosure of which application is incorporated herein by reference.

The blend of this invention may be substituted for known thickeners in any aqueous system in which thickeners are normally utilized and therefore the fields of use of the thickeners of the invention include a host of industrial, household, medical, personal care and agricultural compositions. As indicated above, thickening in such compositions is often also accompanied by other improvements, such as leveling, flow, stabilization, suspension, high and low shear viscosity control, and binding properties.

EXAMPLES

Examples 1–13

Preparation of Non-Urethane Thickener Compounds

Example 1

This example will illustrate the use of dimethyl benzyl acetal to introduce the tolyl group into the structure of the molecule. To a 250 ml round bottom flask equipped with a stirrer, nitrogen inlet tube, and a distillation head were added 80 millimoles of nonylphenol ethoxylate (nominal 100 ethyleneoxy units per mote of ethoxylate) and 20 millimoles of polyethylene glycol having a molecular weight of about 8,000 grams/mole and sufficient toluene to form a dilute solution/dispersion. The mixture was heated to azeotropically distill off moisture in the reactants with stirring+$N_2$ sparge. After the water concentration is reduced, e.g. to less than 50 ppm the mixture was cooled to 80° C. Benzyl dimethyl acetal in an amount of 60 millimoles was then added and heat was applied to distill off formed methanol. The remaining toluene was then vacuum distilled off. Butoxytriglycol (BTG) and water were then added.

Example 2

This example will illustrate the production of a compound of formula I wherein $B^3$ and $B^4$ are amino groups. To a round bottom flask equipped with a stirrer, nitrogen inlet tube, and a distillation head, add 80 millimoles of nonylphenol ethoxylate (nominal 100 ethyleneoxy units per mole of ethoxylate) and 400 grams of toluene. To this mixture, add 80 millimoles of sodium hydroxide (as an aqueous solution at 50% by weight sodium hydroxide). Then heat the flask to azeotropically distill off most of the water with stirring and nitrogen gas sparging. Cool the solution to 80° C. after which add 80 millimoles of epichlorohydrin. Allow to react until substantially all of the nonylphenol ethoxylate is capped with epichlorohydrin. Then add 20 millimoles of a polyethylene glycol having a molecular weight of about 6,000 grams/mole and amine terminated at each end (e.g. Jeffamine ED-6000). The reaction mixture is then maintained at 120° C. until the epoxide titration reaches approximately zero. (A 4.0 gram aliquot of the reaction mixture+4 grams of tetraethylammonium bromide can be dissolved in 50 ml of glacial acetic acid and the resulting solution titrated with a 0.1036 N $HClO_4$ in glacial acetic acid solution to a methyl violet end point for the amount of epoxide (epoxy titration). The reaction mixture can then be neutralized to a substantially neutral pH (about pH 7) with aqueous hydrochloric acid. Butoxytriglycol (BTG) and water can then be added.

Example 3

This example will illustrate the production of a compound of formula I wherein $B^3$ and $B^4$ are amido groups. To a round bottom flask equipped with a stirrer, nitrogen inlet tube, and a distillation head, add 80 millimoles of nonylphenol ethoxylate (nominal 100 ethyleneoxy units per mole of ethoxylate) and 400 grams of toluene. To this mixture, add 80 millimoles of sodium hydroxide (as an aqueous solution at 50% by weight sodium hydroxide). Then heat the flask to azeotropically distill off most of the water with stirring and nitrogen gas sparging. Cool the solution to 80° C. after which add 80 millimoles of chloroacetic acid. Allow to react until substantially all of the nonylphenol ethoxylate is capped. Then add 20 millimoles of a polyethylene glycol having a molecular weight of about 6,000 grams/mole and amine terminated at each end (e.g. Jeffamine ED-6000). The reaction mixture is then maintained at 120° C. until the reaction reaches substantial completion. The reaction mixture can then be neutralized to a substantially neutral pH (about pH 7) with aqueous hydrochloric acid. Butoxytriglycol (BTG) and water can then be added.

Example 4

This example illustrates the production of a compound of formula I wherein $B^3$ and $B^4$ are ether linkages. To a round bottom flask equipped with a stirrer, nitrogen inlet tube, and a distillation head, were added 70 millimoles of tridecyl alcohol ethoxylate (nominal 100 ethyleneoxy units per mole of ethoxylate), 30 millimoles of polyethylene glycol having a molecular weight of about 8,000 grams/mole and 400 grams of toluene. To this mixture was added 140 millimoles of sodium hydroxide (as an aqueous solution at 50% by weight sodium hydroxide). The flask was then heated to azeotropically distill off most of the water with stirring and nitrogen gas sparging. The conditions of distillation were such that about 1,000 ppm of water remained in the toluene solution. The solution was then cooled to 80° C. after which 90 millimoles of epichlorohydrin were added. The reaction mixture was then maintained at 80° C. until the epoxide titration reached approximately zero. (A 4.0 gram aliquot of the reaction mixture and 4 grams of tetraethylammonium bromide can be dissolved in 50 ml of glacial acetic acid and the resulting solution titrated with a 0.1036 N $HClO_4$ in glacial acetic acid solution to a methyl violet end point for the amount of epoxide (epoxy titration). The reaction mixture was then neutralized to a substantially neutral pH (about pH 7) with aqueous hydrochloric acid. Butoxytriglycol (BTG) and water were added to give a clear yellow BTG/$H_2O$/product ratio of 1:2:2 by weight.

Example 5

The reaction was run according to the procedure outlined in Example 4 with the following exceptions. The amount of tridecyl alcohol ethoxylate was 80 millimoles, the amount of polyethylene glycol was 20 millimoles, and the amount of epichlorohydrin was 90 millimoles. In addition, 130 millimoles of sodium methoxide was used in place of the sodium hydroxide and then methanol was distilled off.

Example 6

The reaction was run according to the procedure outlined in Example 4 with the following exceptions. The amount of tridecyl alcohol ethoxylate was 85 millimoles, the amount of polyethylene glycol was 15 millimoles, and the amount of the sodium hydroxide was 130 millimoles.

Example 7

The reaction was run according to the procedure outlined in Example 5 with the following exceptions. The amount of tridecyl alcohol ethoxylate was 85 millimoles, the amount of polyethylene glycol was 15 millimoles, the amount of the sodium methoxide was 130 millimoles, and the amount of the epichlorohydrin was 115 millimoles.

Example 8

The reaction was run according to the procedure outlined in Example 5 with the following exceptions. The tridecyl alcohol ethoxylate was replaced with 80 millimoles of an ethoxylate of mixed alcohols having 12, 13, and 14 carbon atoms (nominal degree of ethoxylation of 100 moles of ethylene oxide per mole of alcohol) and the amount of polyethylene glycol was 20 millimoles.

Example 9

The reaction was run according to the procedure outlined in Example 5 with the following exceptions. The tridecyl alcohol ethoxylate was replaced with 80 millimoles of an ethoxylate of mixed alcohols having 8, 9, and 10 carbon atoms (nominal degree of ethoxylation of 100 moles of ethylene oxide per mole of alcohol) and the amount of polyethylene glycol was 20 millimoles.

Example 10

The reaction was run according to the procedure outlined in Example 5 with the following exceptions. The tridecyl alcohol ethoxylate was replaced with 80 millimoles of a nonyl phenol ethoxylate (nominal degree of ethoxylation of 100 moles of ethylene oxide per mole of alcohol) and the amount of polyethylene glycol was 20 millimoles.

Example 12

This example will illustrate the use of meta-alpha,alpha'-dichloromethyl benzene to introduce the meta-xylyl group into the structure of the molecule. To a 250 ml round bottom flask equipped with a stirrer, nitrogen inlet tube, and a distillation head were added 65 parts of tridecyl alcohol ethoxylate (nominal 100 ethyleneoxy units per mole of ethoxylate) and 18.5 parts by weight of polyethylene glycol having a molecular weight of about 8,000 grams/mole and 82 parts by weight of toluene (the mixture having a hydroxyl equivalent of 4.06. The mixture was heated to azeotropically distill off the water with stirring+$N_2$ sparge. After the water concentration is less than 50 ppm the mixture was cooled to 90° C. Sodium methoxide was added in an amount of 4.1 parts by weight of 25% sodium methoxide in methanol such that OH:NaOMe=1:1 based on the calculated hydroxyl value of the mixture. Heat was applied to distill off formed methanol (by distilling off about half of the initial weight of toluene from the flask). The reaction mixture was then refluxed for 1 hour. The flask was cooled to 80° C. and 1.64 parts by weight of meta-dichloromethyl benzene was added. After about ten minutes, an additional 0.2 parts by weight of meta-dichloromethyl benzene was added. The reaction mixture was maintained at 110° C. for about 1 hour then allowed to stand at room temperature for 16 hours before being reheated to 110° C. for about 2 more hours. The remaining toluene was then vacuum stripped. 76 parts by weight of distilled water was added to give a water white product which was cooled to room temperature.

Example 13

This example will illustrate the use of dimethyl maleate to introduce an ester linkage into the structure of the molecule. To a 250 ml round bottom flask equipped with a stirrer, nitrogen inlet tube, and a distillation head were added 86 parts of tridecyl alcohol ethoxylate (nominal 100 ethyleneoxy units per mole of ethoxylate) and 15.6 parts by weight of polyethylene glycol having a molecular weight of about 8,000 grams/mole and 20 parts by weight of toluene (the mixture having a hydroxyl equivalent of 1.8). To this mixture was added 1.8 parts by weight of dimethyl maleate. The mixture was then heated to 100° C. to azeotropically distill off any water with stirring+$N_2$ sparge. Then 0.1% of a commercial esterification catalyst, Fascat 4100, M&T Chemicals, Rahway, N.J., was and the mixture was heated to 170° C. for two hours.

This maleate ester was then converted to a sulfosuccinate ester by reaction with metabisulfite. To perform this reaction, the cooled reaction product from above was mixed with 100 parts by weight of deionized water and then 1.14 parts by weight of $Na_2S_2O_5$ were added. The progress of the reaction was determined by titration with iodine and was quenched at about 92% conversion.

Examples 14–61

Preparation of Urethane Thickener Compounds

Example 14

A mixture of 100 millimoles of a polyethylene glycol having a molecular weight of about 10000 and 900 grams of toluene is dried by azeotropic distillation. The mixture is cooled to 60° C. and 1 gram of dibutyltin dilaurate is added, followed by 220 millimoles of n-octanol. Then 220 millimoles of xylylene di-isocyanate is added and the mixture is held at 60° C. until the residual isocyanate functionality is less than 0.5% of the isocyanate charged.

Example 15

A mixture of 100 millimoles of a polyethylene glycol having a molecular weight of about 6000 and 600 grams of toluene is dried by azeotropic distillation. The mixture is cooled to 60° C. and 0.6 grams of dibutyltin dilaurate is added, followed by 210 millimoles of ethoxylated nonylphenol (nominal 3 ethyleneoxy units per mole of ethoxylate). Then 210 millimoles of toluene di-isocyanate is added and the mixture is held at 60° C. until the residual isocyanate functionality is less than 0.5% of the isocyanate charged.

Example 16

A mixture of 100 millimoles of a polyethylene glycol having a molecular weight of about 8000 and 900 grams of toluene is dried by azeotropic distillation. The mixture is cooled to 60° C. and 0.8 grams of dibutyltin dilaurate is added, followed by 200 millimoles of ethoxylated nonylphenol (nominal 1.5 ethyleneoxy units per mole of ethoxylate). Then 200 millimoles of toluene di-isocyanate is added and the mixture is held at 60° C. until the residual isocyanate functionality is less than 0.5% of the isocyanate charged.

Example 17

A mixture of 100 millimoles of a polyethylene glycol having a molecular weight of about 12000 and 1200 grams of toluene is dried by azeotropic distillation. The mixture is cooled to 60° C. and 1.2 grams of dibutyltin dilaurate is added, followed by 225 millimoles of ethoxylated n-dodecanol (nominal 3 ethyleneoxy units per mole of ethoxylate). Then 225 millimoles of hexamethylene di-isocyanate is added and the mixture is held at 60° C. until the residual isocyanate functionality is less than 0.5% of the isocyanate charged.

Example 18

A mixture of 100 millimoles of a polyethylene glycol having a molecular weight of about 16000 and 1600 grams of toluene is dried by azeotropic distillation. The mixture is cooled to 60° C. and 1.6 grams of dibutyltin dilaurate is added, followed by 210 millimoles of ethoxylated n-tetradecanol (nominal 1.5 ethyleneoxy units per mole of ethoxylate). Then 210 millimoles of xylylene diisocyanate is added and the mixture is held at 60° C. until the residual isocyanate functionality is less than 0.5% of the isocyanate charged.

Example 19

A mixture of 100 millimoles of a polyethylene glycol having a molecular weight of about 4000 and 500 grams of toluene is dried by azeotropic distillation. The mixture is cooled to 60° C. and 0.4 grams of dibutyltin dilaurate is added, followed by 215 millimoles of di-octylphenol. Then 215 millimoles of 4,4"-methylene bis(isocyantophenyl) is added and the mixture is held at 60° C. until the residual isocyanate functionality is less than 0.5% of the isocyanate charged.

Example 20

A mixture of 100 millimoles of a polyethylene glycol having a molecular weight of about 14000 and 1300 grams of toluene is dried by azeotropic distillation. The mixture is cooled to 60° C. and 1.4 grams of dibutyltin dilaurate is added, followed by 230 millimoles of ethoxylated di-nonylphenol (nominal 6 ethyleneoxy units per mole of ethoxylate). Then 230 millimoles of hexamethylene di-isocyanate is added and the mixture is held at 60° C. until the residual isocyanate functionality is less than 0.5% of the isocyanate charged.

Example 21

A mixture of 100 millimoles of a polyethylene glycol having a molecular weight of about 8000 and 700 grams of toluene is dried by azeotropic distillation. The mixture is cooled to 60° C. and 0.8 grams of dibutyltin dilaurate is added, followed by 210 millimoles of ethoxylated nonylphenol (nominal 1.5 ethyleneoxy units per mole of ethoxylate). Then 210 millimoles of xylylene di-isocyanate is added and the mixture is held at 60° C. until the residual isocyanate functionality is less than 0.5% of the isocyanate charged.

Example 22

A mixture of 100 millimoles of a polyethylene glycol having a molecular weight of about 6000 and 500 grams of toluene is dried by azeotropic distillation. The mixture is cooled to 60° C. and 0.6 gram of dibutyltin dilaurate is added, followed by 220 millimoles of n-tetradecanol. Then 220 millimoles of xylylene diisocyanate is added and the mixture is held at 60° C. until the residual isocyanate functionality is less than 0.5% of the isocyanate charged.

Example 23

A mixture of 100 millimoles of a polyethylene glycol having a molecular weight of about 6000 and 600 grams of toluene is dried by azeotropic distillation. The mixture is cooled to 60° C. and 0.6 grams of dibutyltin dilaurate is added, followed by 210 millimoles of ethoxylated nonylphenol (nominal 3 ethyleneoxy units per mole of ethoxylate). Then 210 millimoles of toluene di-isocyanate is added and the mixture is held at 60° C. until the residual isocyanate functionality is less than 0.5% of the isocyanate charged.

Example 24

A mixture of 100 millimoles of a polyethylene glycol having a molecular weight of about 8000 and 900 grams of toluene is dried by azeotropic distillation. The mixture is cooled to 60° C. and 0.8 grams of dibutyl tin dilaurate is added, followed by 200 millimoles of octadecanol. Then 200 millimoles of 4,4"-methylene bis(isocyantophenyl) is added and the mixture is held at 60° C. until the residual isocyanate functionality is less than 0.5% of the isocyanate charged.

Example 25

A mixture of 100 millimoles of a polyethylene glycol having a molecular weight of about 12000 and 1200 grams of toluene is dried by azeotropic distillation. The mixture is cooled to 60° C. and 1.2 grams of dibutyltin dilaurate is added, followed by 225 millimoles of hexadecanol. Then 225 millimoles of hexamethylene di-isocyanate is added and the mixture is held at 60° C. until the residual isocyanate functionality is less than 0.5% of the isocyanate charged.

Example 26

A mixture of 100 millimoles of a polyethylene glycol having a molecular weight of about 10000 and 1100 grams of toluene is dried by azeotropic distillation. The mixture is cooled to 60° C. and 1 gram of dibutyltin dilaurate is added, followed by 210 millimoles of ethoxylated nonylphenol (nominal 1.5 ethyleneoxy units per mole of ethoxylate). Then 210 millimoles of 4,4"-methylene bis(isocyantophenyl) is added and the mixture is held at 60° C. until the residual isocyanate functionality is less than 0.5% of the isocyanate charged.

Example 27

A mixture of 100 millimoles of a polyethylene glycol having a molecular weight of about 16000 and 1500 grams of toluene is dried by azeotropic distillation. The mixture is cooled to 60° C. and 1.6 grams of dibutyltin dilaurate is added, followed by 215 millimoles of ethoxylated octadecanol (nominal 3 ethyleneoxy units per mole of ethoxylate). Then 215 millimoles of toluene di-isocyanate is added and the mixture is held at 60° C. until the residual isocyanate functionality is less than 0.5% of the isocyanate charged.

Example 28

A mixture of 100 millimoles of a polyethylene glycol having a molecular weight of about 4000 and 500 grams of toluene is dried by azeotropic distillation. The mixture is cooled to 60° C. and 0.4 grams of dibutyltin dilaurate is added, followed by 230 millimoles of ethoxylated di-nonylphenol (nominal 6 ethyleneoxy units per mole of ethoxylate). Then 230 millimoles of xylylene di-isocyanate is added and the mixture is held at 60° C. until the residual isocyanate functionality is less than 0.5% of the isocyanate charged.

Example 29

A mixture of 100 millimoles of a polyethylene glycol having a molecular weight of about 8000 and 700 grams of toluene is dried by azeotropic distillation. The mixture is cooled to 60° C. and 0.8 grams of dibutyltin dilaurate is added, followed by 210 millimoles of dodecanol. Then 210 millimoles of xylylene di-isocyanate is added and the mixture is held at 60° C. until the residual isocyanate functionality is less than 0.5% of the isocyanate charged.

Examples 30–45

Each of Examples 14–29 can be repeated with the following change in procedure. The di-isocyanate is added to the glycol prior to the addition of the monohydric reactant and the di-isocyanate and the glycol are allowed to react until the residual hydroxyl functionality is less than 0.5% of the hydroxyl charged. Then the monohydric reactant is charged and the mixture is held at 60° C. until the residual isocyanate functionality is less than 0.5% of the isocyanate charged.

Examples 46–61

Each of Examples 14–29 can be repeated with the following change in procedure. The monohydric reactant is charged first followed by the toluene solvent and the dibutyltin dilaurate catalyst. The di-isocyanate is then slowly added to the monohydric reactant and the mixture is allowed to react until the residual hydroxyl functionality is less than 0.5% of the hydroxyl charged. Then the glycol is slowly added and the mixture is held at 60° C. until the residual isocyanate functionality is less than 0.5% of the isocyanate charged.

PIGMENT DISPERSION AND PAINT PREPARATION

A latex paint can be prepared from the following ingredients by the following procedure. A pigment dispersion is first prepared by vigorously mixing and grinding the following ingredients

| Ingredients | Parts by Weight |
| --- | --- |
| Propylene glycol | 65.0 |
| Pigment Dispersant (Tamol 331, 25% solids, Rohm & Haas) | 8.9 |
| Defoamer (Foamaster VL, Henkel Corp.) | 1.0 |
| Biocide (Kathon LX, Rohm & Haas) | 1.8 |
| Titanium dioxide pigment (TI-Pure R-900, DuPont) | 175.0 |
| Water | 12.0 |

To the above pigment grind then add:

| | |
| --- | --- |
| Water | 88.0 |
| Binder Resin (Rhoplex SG-10M, 50% solids, Rohm & Haas) | 489.2 |
| Texanol (2,2,4-trimethylpentanediol monoisobutyrate) | 24.5 |
| Defoamer (Foamaster VL, Henkel Corp.) | 2.0 |

The above mixture is mixed and then diluted with an additional 72.4 parts by weight of water. A series of thickened paints can then be prepared by adding 5, 10, 15, 20, or 25 parts by weight, respectively, of a thickener of Examples 1–13, and 1, 2, 3, 4, 5, 6, or 7 parts by weight of a thickener of Examples 14–61, to separate samples of the above unthickened paint.

What is claimed is:

1. A blend useful as an aqueous thickener comprising a urethane compound effective as an associative thickener and at least one non-urethane compound of the formula:

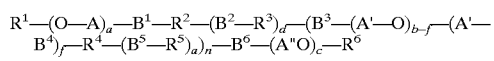

wherein:

$R^1$ and $R^6$ are monovalent hydrophobic groups independently selected from the group consisting of an aliphatic group, a substituted aliphatic group, an aromatic group, and a substituted aromatic group;

$R^2$ and $R^4$ are independently selected from the group consisting of aliphatic, substituted aliphatic, aromatic, or substituted aromatic radicals, each radical being divalent or trivalent, and wherein each group contains at least 3 carbon atoms;

$R^3$ and $R^5$ are independently selected from hydrogen, lower alkyl and lower aralkyl;

$B^1$, $B^3$, and $B^6$ and $B^2$, $B^4$ and $B^5$ when present are linking groups independently selected from the group consisting of an oxygen atom, a carboxylate group, an amino group, and an amido group;

each of a, b, c, d, e, f, and n are integers, wherein each of a and c are independently any integer from greater than 20 to about 200; b is any integer from greater than 20 to about 450; d, e, and f are zero or 1; and n is any integer from 1 to about 5; and each of A, A', and A" is independently an ethylene, 1,2-propylene, 1,2-butylene unit or combinations thereof.

2. A blend of claim 1 wherein each of $B^1$, $B^3$, and $B^6$, and $B^2$, $B^4$, and $B^5$ when present is an oxygen atom.

3. A blend of claim 1 wherein d and e are each zero and $R^2$ and $R^4$ are both divalent radicals selected from the group consisting of alkylene groups having from 3 to 10 carbon atoms and aralkylene radicals having one benzenoid ring and from 1 to 10 alkylene carbon atoms.

4. A blend of claim 1 wherein d and e are each 1 and $R^2$ and $R^4$ are both trivalent radicals selected from the group consisting of alkanetriyl groups having from 3 to 10 carbon atoms.

5. A blend of claim 1 wherein each of each of $R^1$ and $R^6$ is independently an aliphatic, substituted aliphatic, aromatic, or substituted aromatic radical having from 10 to about 30 carbon atoms.

6. A blend of claim 1 wherein each of d and e is 1 and each of $R^3$ and $R^5$ is hydrogen, methyl, or benzyl.

7. A blend of claim 1 wherein each of each of A, A', and A" is ethylene.

8. A blend of claim 1 wherein each of a and c is independently from about 50 to about 150.

9. A blend of claim 1 wherein b is from about 90 to about 300.

10. A blend of claim 1 wherein n is 1.

11. A blend of claim 1 wherein $R^1$ and $R^6$ are the same and are selected from the group consisting of alkyl groups having from about 8 to about 15 carbon atoms and alkylphenyl groups wherein the alkyl groups have from about 6 to about 12 carbon atoms.

12. A blend of claim 1 wherein each of $R^1$ and $R^6$ is independently an aliphatic, substituted aliphatic, aromatic, or substituted aromatic radical having from 10 to about 30 carbon atoms; $R^2$ and $R^4$ are both trivalent radicals selected from the group consisting of alkanetriyl groups having from 3 to 10 carbon atoms: d and e are each 1; $R^3$ and $R^5$ are hydrogen, methyl or benzyl; f is zero, each of $B^1$, $B^3$ and $B^6$, and $B^2$, $B^4$ and $B^5$ when present is an oxygen atom; each of A, A; and A" are ethylene; a and c are independently from about 50 to about 150; b is from about 150 to about 300; and n is 1.

13. A blend of claim 12 wherein $R^2$ and $R^4$ are both propanetriyl radicals.

14. A blend of claim 1 wherein each of $R^1$ and $R^6$ is independently an aliphatic, substituted aliphatic, aromatic or substituted aromatic radical having from 10 to about 30 carbon atoms; $R^2$ and $R^4$ are both divalent radicals selected from the group consisting of alkylene groups having from 3 to 10 carbon atoms and aralkylene radicals having one benzenoid ring and from 1 to 10 alkylene carbon atoms; d, e, and f are each zero; each of $B^1$, $B^3$, and $B^6$, and $B^2$, $B^4$, and $B^5$ when present is an oxygen atom; each of A, A', and A" are ethylene; a and c are independently from about 50 to about 150; b is from about 150 to about 300; and n is 1.

15. A blend of claim 14 wherein $R^2$ and $R^4$ are both meta-xylyl radicals.

16. A blend of claim 1 wherein said at least one non-urethane compound is a mixture of compounds of the formula:

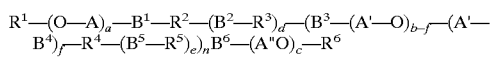

wherein:

$R^1$ and $R^6$ are monovalent hydrophobic groups independently selected from the group consisting of an aliphatic group, a substituted aliphatic group, an aromatic group, and a substituted aromatic group;

$R^2$ and $R^4$ are independently selected from the group consisting of aliphatic, substituted aliphatic, aromatic, or substituted aromatic radicals, each radical being divalent or trivalent and wherein each group contains at least 3 carbon atoms;

$R^3$ and $R^5$ are independently selected from hydrogen, lower alkyl and lower aralkyl;

$B^1$, $B^3$, and $B^6$, and $B^2$, $B^4$, and $B^5$ when present are linking groups independently selected from the group consisting of an oxygen atom, a carboxylate group, an amino group, and an amido group;

each of a, b, c, d, e, and f are integers, wherein each of a and c are independently any integer from greater than 20 to about 200; b is any integer from greater than 20 to about 450; d, e, and f are zero or 1; and n for the mixture is any integer or non-integer from 0.5 to 4.5; and each of A, A', and A" is independently an ethylene, 1,2-propylene, 1,2-butylene unit or combinations thereof.

17. A blend as claimed in claim 16 wherein n is from 0.5 to 1.5.

18. An aqueous composition comprising water, a urethane compound effective as an associative thickener, and at least one non-urethane compound having the formula:

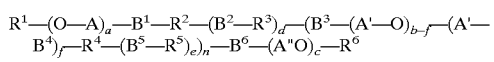

wherein:

$R^1$ and $R^6$ are monovalent hydrophobic groups independently selected from the group consisting of an aliphatic group, a substituted aliphatic group, an aromatic group, and a substituted aromatic group;

$R^2$ and $R^4$ are independently selected from the group consisting of aliphatic, substituted aliphatic, aromatic, or substituted aromatic radicals, each radical being divalent or trivalent, and wherein each group contains at least 3 carbon atoms;

$R^3$ and $R^5$ are independently selected from hydrogen, lower alkyl and lower aralkyl;

$B^1$, $B^3$ and $B^6$, and $B^2$, $B^4$, and $B^5$ when present are linking groups independently selected from the group consisting of an oxygen atom, a carboxylate group an amino group, and an amido group;

each of a, b, c, d. e, f, and n are integers, wherein each of a and c are independently any integer from greater than 20 to about 200; b is any integer from greater than 20 to about 450; d, e, and f are zero or 1; and n is any integer from 1 to about 5; and each of A, A', and A" is independently an ethylene, 1,2-propylene, 1,2-butylene unit or combinations thereof.

19. A latex composition comprising water, an emulsion polymer, a urethane compound effective as an associative thickener and at least one compound having the formula:

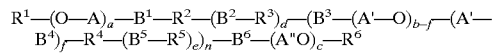

wherein:

$R^1$ and $R^6$ are monovalent hydrophobic groups independently selected from the group consisting of an aliphatic group, a substituted aliphatic group, an aromatic group, and a substituted aromatic group;

$R^2$ and $R^4$ are independently selected from the group consisting of aliphatic, substituted aliphatic, aromatic, or substituted aromatic radicals, each radical being divalent or trivalent, and wherein each group contains at least 3 carbon atoms;

$R^3$ and $R^5$ are independently selected from hydrogen, lower alkyl and lower aralkyl;

$B^1$, $B^3$, and $B^6$, and $B^2$, $B^4$, and $B^5$ when present are linking groups independently selected from the group consisting of an oxygen atom, a carboxylate group, an amino group, and an amido group;

each of a, b, c, d, e, f, and n are integers, wherein each of a and c are independently any integer from greater than 20 to about 200; b is any integer from greater than 20 to about 450; d, e, and f are zero or 1; and n is any integer from 1 to about 5; and each of A, A', and A" is independently an ethylene, 1,2-propylene, 1,2-butylene unit or combinations thereof.

20. A latex composition of claim 19 wherein the sum of the weights of said urethane compound and said non-urethane compound are from about 0.1% to about 10% by weight based emulsion polymer solids of said latex composition.

21. A blend useful as an aqueous thickener comprising a urethane compound effective as an associative thickener and a non-urethane compound of the formula:

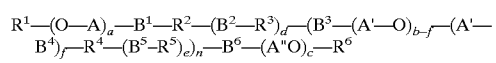

wherein $R^1$ and $R^6$ are monovalent hydrophobic groups independently selected from the group consisting of an aliphatic group, a substituted aliphatic group, and aromatic group, and a substituted aromatic group;

$R^2$ and $R^4$ are independently selected from the group consisting of aliphatic, substituted aliphatic, aromatic, or substituted aromatic radicals each radical being divalent or trivalent;

$R^3$ and $R^5$ are independently selected from hydrogen, lower alkyl and lower aralkyl;

each of $B^1$, $B^3$, and $B^6$, and $B^2$, $B^4$, and $B^5$ when present is a carboxylate linking group; each of a, b, c, d, e, f, and n is an integer, wherein each of a and c is independently any integer from greater than 20 to about 200; b is any integer from greater than 20 to about 450; d, e, and f are zero or 1, and n is any integer from 1 to about 5; and each of A, A' and A" is independently an ethylene, 1,2-propylene, 1,2-butylene unit or combinations thereof.

22. A blend useful as an aqueous thickener comprising a urethane compound effective as an associative thickener and a non-urethane compound of the formula

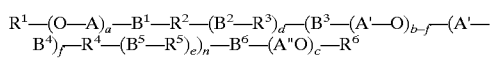

wherein:

$R^1$ and $R^6$ are monovalent hydrophobic groups independently selected from the group consisting of an aliphatic group, a substituted aliphatic group, and aromatic group, and a substituted aromatic group;

$R^2$ and $R^4$ are independently selected from the group consisting of aliphatic, substituted aliphatic, aromatic, or substituted aromatic radicals, each radical being divalent or trivalent;

$R^3$ and $R^5$ are independently selected from hydrogen, lower alkyl and lower aralkyl;

each of $B^1$, $B^3$, and $B^6$, and $B^2$, $B^4$, and $B^5$ when present is an amino group or amido group having the formula —N(R)—, wherein R is selected from the group consisting of hydrogen, lower alkyl, and loser acyl;

each of a, b, c, d, e, f, and n is an integer, wherein each of a and c is independently any integer from greater than 20 to about 200; b is any integer from greater than 20 to about 450; d and e are zero or 1 and f is 1; and n is any integer from 1 to about 5; and each of A, A' and A" is independently an ethylene, 1,2-propylene, 1,2-butylene unit or combinations thereof.

23. A blend of claim 1 wherein $R^2$ and $R^4$ are both propanetriyl radicals or are both meta-xylyl radicals.

24. A blend of claim 1 wherein the blend also contains an effective quantity of a viscosity modifier selected from the group consisting of a liquid polyol, a liquid ethoxylated or propoxylated $C_{1-8}$ alcohol, and a liquid ethoxylated or propoxylated $C_{1-8}$ carboxylic acid.

* * * * *